(12) United States Patent
Norström

(10) Patent No.: US 6,241,430 B1
(45) Date of Patent: Jun. 5, 2001

(54) CUTTING INSERT HAVING A CHIP FORMER

(75) Inventor: Thomas Norström, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 09/447,353

(22) Filed: Nov. 22, 1999

(30) Foreign Application Priority Data

Nov. 20, 1998 (SE) .................................................. 9803966

(51) Int. Cl.[7] .................................................. B23B 27/22
(52) U.S. Cl. ............................ 407/114; 407/115; 407/116
(58) Field of Search .................................. 407/114, 115, 407/116, 113

(56) References Cited

U.S. PATENT DOCUMENTS

| | | | |
|---|---|---|---|
| 3,751,782 | * 8/1973 | Fruish | 407/114 |
| 4,681,487 | 7/1987 | Pettersson . | |
| 5,676,495 | * 10/1997 | Katbi et al. | 407/114 |
| 5,779,401 | * 7/1998 | Stallwitz et al. | 407/114 |

FOREIGN PATENT DOCUMENTS 0 422 586  4/1991 (EP) .

* cited by examiner

*Primary Examiner*—Henry Tsai
(74) *Attorney, Agent, or Firm*—Burns, Doane, Swecker & Mathis, L.L.P.

(57) ABSTRACT

A turning insert, preferably for internal machining, includes a polygonal body of hard wear resistant material, which has an upper surface and a lower surface provided in separate substantially parallel planes and a number of side surfaces each interconnecting the upper and lower surfaces. A first side surface is a leading edge surface, and a second side surface is a trailing edge surface during machining. At least one chip former is provided. At least one rounded cutting corner having cutting edges is formed at an intersection of the two side surfaces. The cutting corner defines a bisector plane. The chip former is asymmetrically arranged relative to the bisector plane. The chip former has a surface that is provided in the plane of the upper surface. The surface is provided at substantially one side of the bisector plane and the convex portion of the chip former has a lower edge intersected by the bisector plane at least twice.

7 Claims, 6 Drawing Sheets

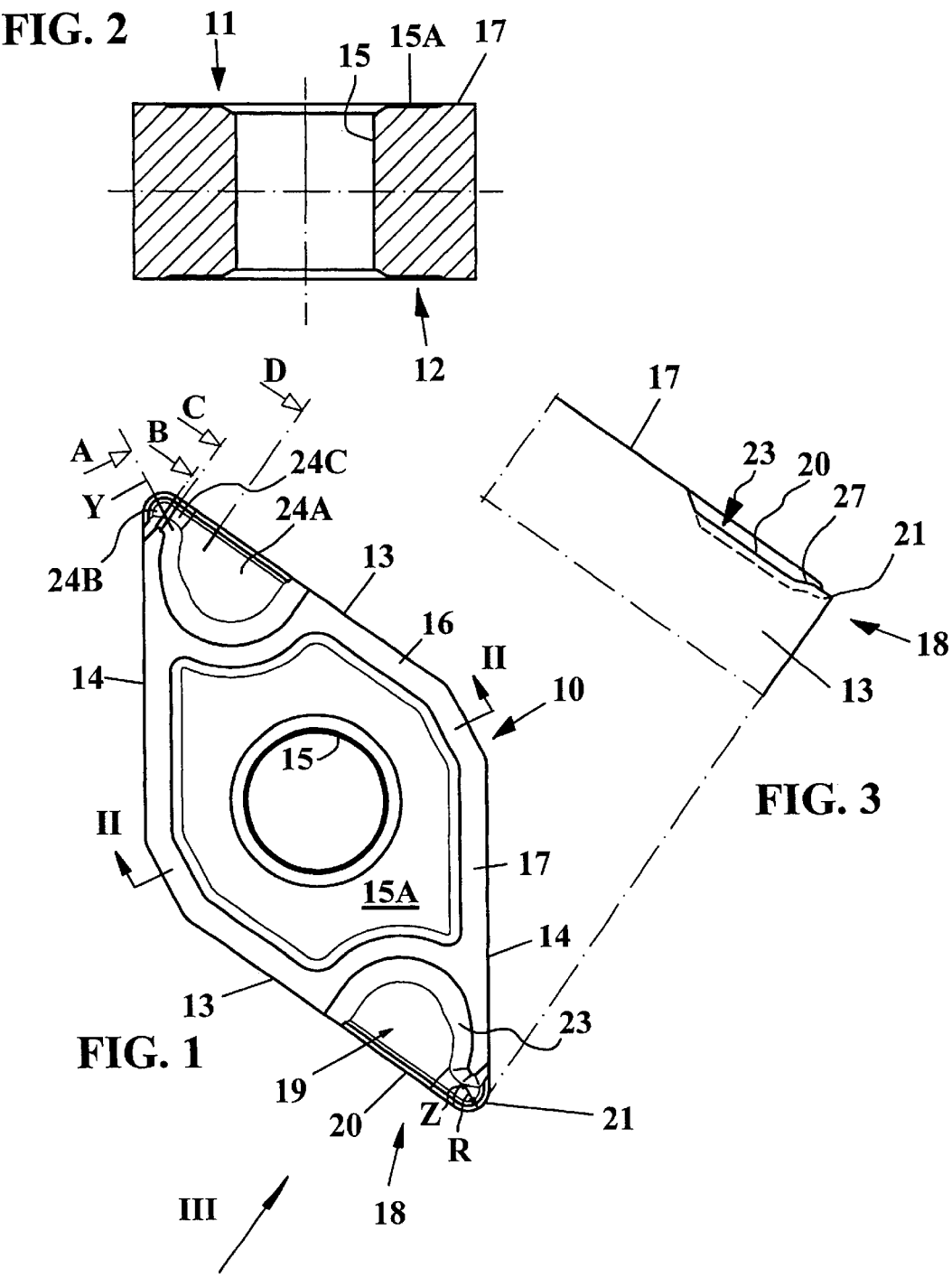

CUTTING INSERT HAVING A CHIP FORMER

BACKGROUND OF THE INVENTION

The present invention relates to a turning insert for the cutting machining of metallic workpieces. More specifically the present invention relates to a turning insert with a chip former, developed foremost to be used for internal turning.

PRIOR ART

Special demands are put on a metal cutting tool during turning of internal surfaces in comparison with external longitudinal turning. Such demands involve the need for low cutting forces due to long moment arms, and controlled chip forming in order not to damage the generated surface. European Document A2-0 422 586 relates to a single sided cutting insert having an elliptical chip breaker which directs the chip in a desired direction while however presenting a risk of damaging the generated surface. From U.S. Pat. No. 4,681,487 there is previously known a double-sided cutting insert for external turning having a chip breaker both for fine and rough turning.

OBJECTS AND SUMMARY OF THE INVENTION

One object of the present invention is to provide a cutting insert, which remains stable during internal turning.

Another object of the present invention is to provide a cutting insert producing chips that do not damage the generated surface.

Another object of the present invention is to provide a cutting insert that produces low cutting forces.

Another object of the present invention is to provide a cutting insert with strong cutting corners.

Another object of the present invention is to provide a cutting insert that provides controlled chip forming.

These and other objects of the present invention are realized by a turning insert. The insert comprises a polygonal body formed of a hard material and including upper and lower surfaces disposed in substantially parallel respective planes, and a plurality of side surfaces each interconnecting the upper and lower surfaces. The body includes at least one cutting corner formed by two of the side surfaces. Those two side surfaces constitute leading and trailing side surfaces, respectively during a cutting operation. At least the upper surface includes a chip former disposed therein. The cutting corner defines a nose having a bisector plane. The chip former is asymmetrically arranged relative to the bisector plane. The chip former comprises an inclined wall having a portion situated adjacent the nose and being of convex shape as viewed in a direction perpendicular to a plane of the insert. The convex portion includes a lower edge intersected at least at two locations by the bisector plane.

BRIEF DESCRIPTION OF THE DRAWINGS

An example of the invention is described hereinafter with reference to the enclosed drawings, where FIG. 1 shows a top view of a turning insert according to the present invention;

FIG. 2 shows a cross-section according to the line II—II in FIG. 1;

FIG. 3 shows a side view according to the arrow III in FIG. 1;

DETAILED DESCRIPTION OF A PREFERRED EMBODIMENT OF THE INVENTION

Figure 4:
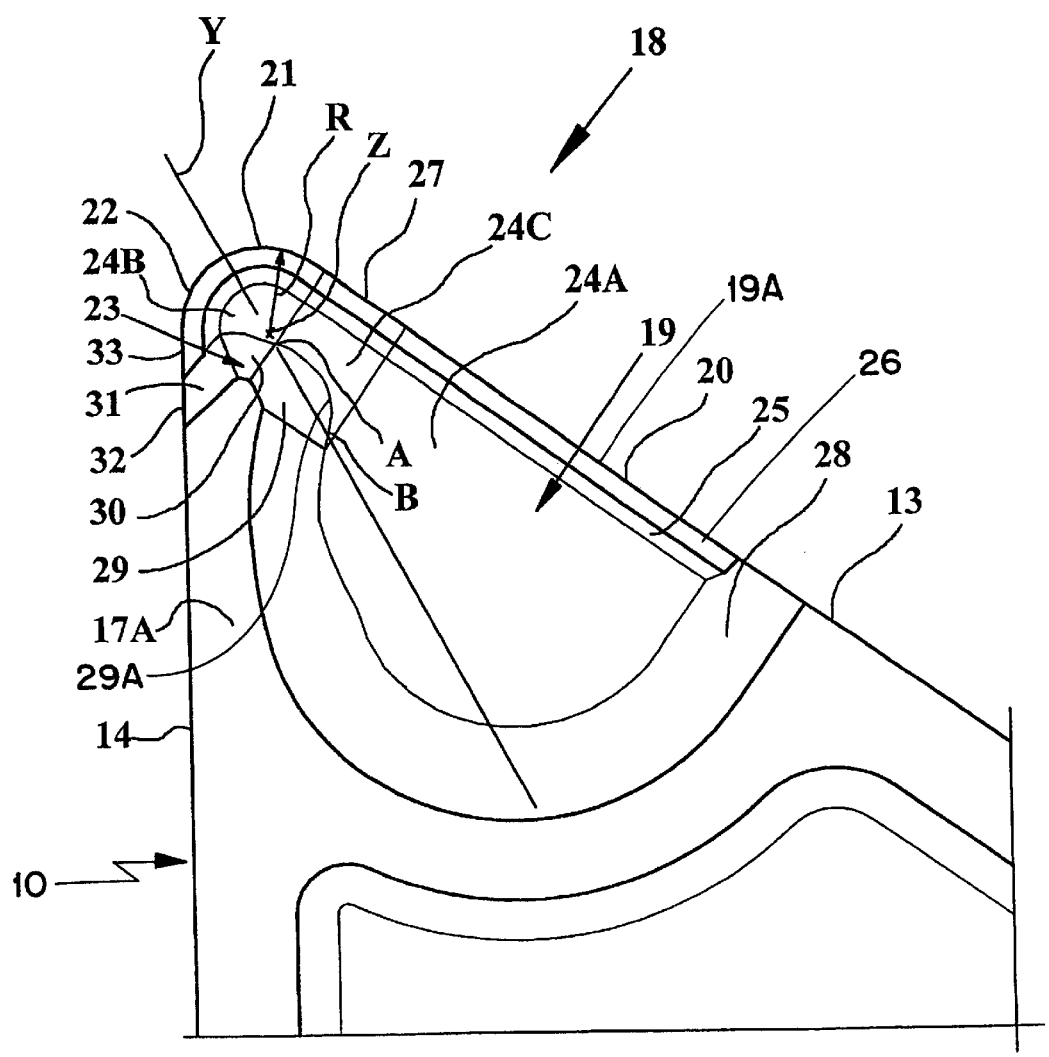
FIG. 4 shows a magnified cutting corner of FIG. 1.
Figure 5A:
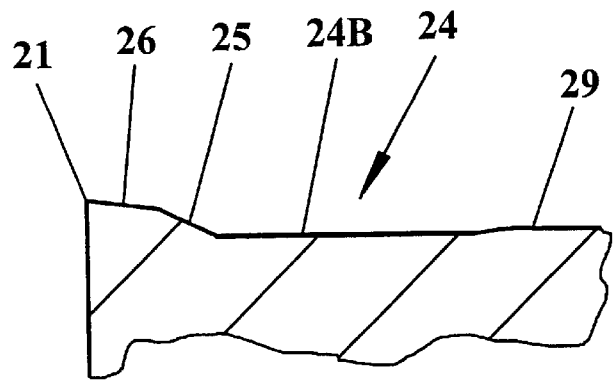
FIG. 5A shows a cross-section according to the line A in FIG. 1.
Figure 5B:
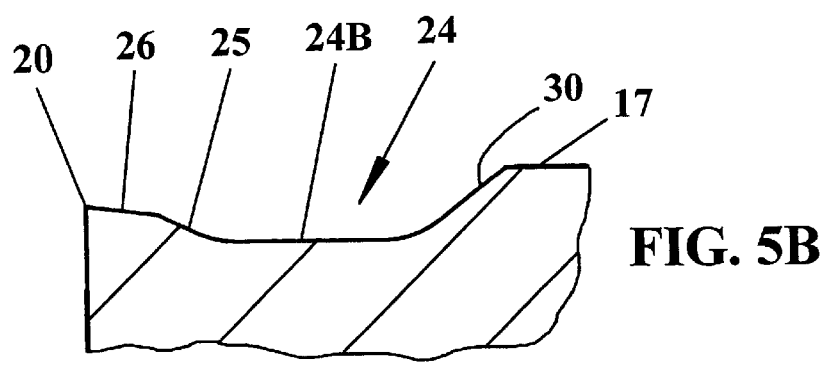
FIG. 5B shows a cross-section according to the line B in FIG. 1.
Figure 5C:
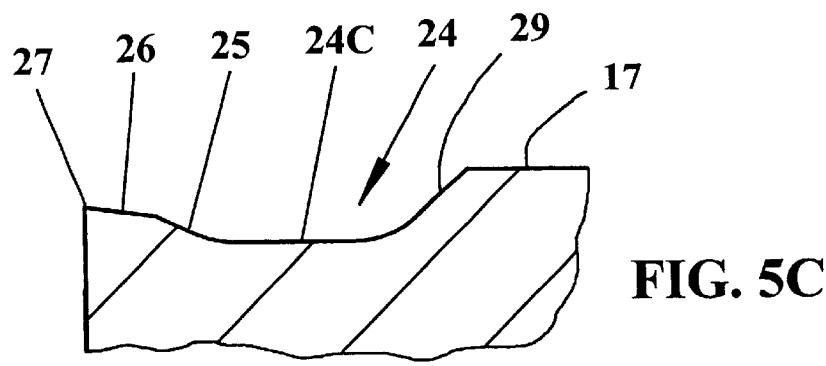
FIG. 5C shows a cross-section according to the line C in FIG. 1.
Figure 5D:
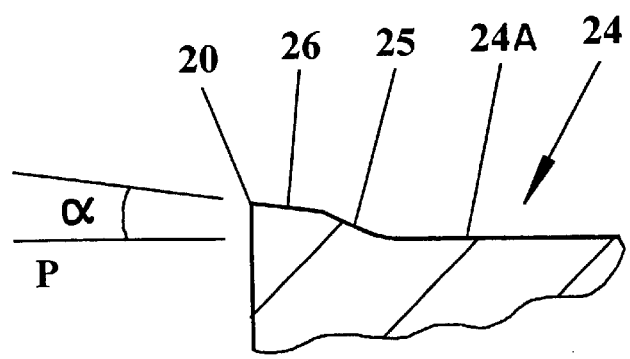
FIG. 5D shows a cross-section according to the line D in FIG. 1.
Figure 6:
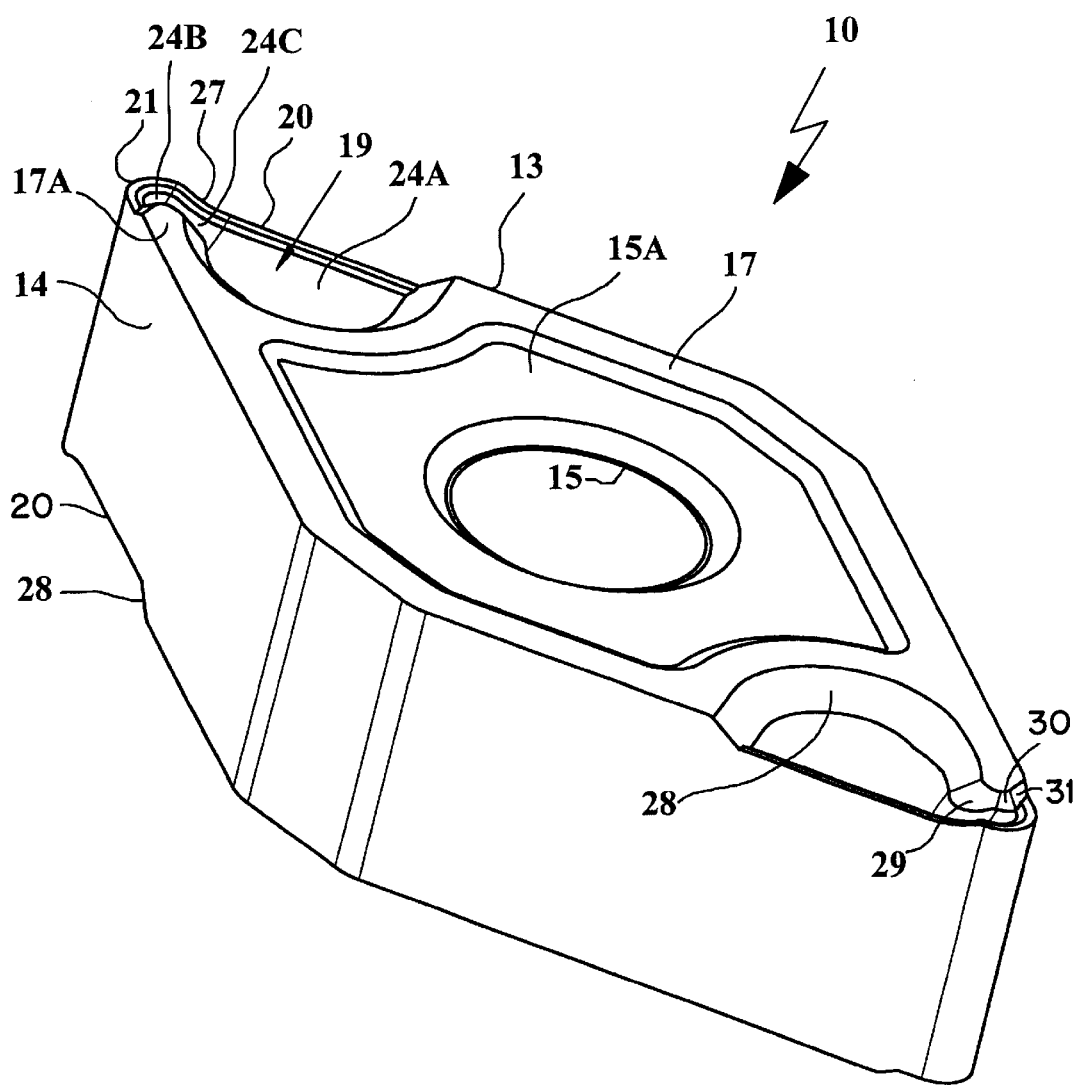
FIG. 6 shows a perspective view of the turning insert.

With reference to FIGS. 1–6, a double sided turning insert 10 according to the present invention is shown with a chip former or chip breaker 23, developed in order to be used mostly during internal turning of metallic workpieces. The cutting insert may of course be used also for external turning but then the advantage of the good chip control achieved by the insert becomes less important. The turning insert 10 has a polygonal body of hard wear resistant material such as cemented carbide, i.e., pressed and sintered tungsten carbide, or ceramics or similar. The body has an upper surface 11 and a lower surface 12 provided in separate, substantially parallel planes and several side surfaces 13, 14, each interconnecting said upper and lower surfaces 11, 12.

Figure 7:
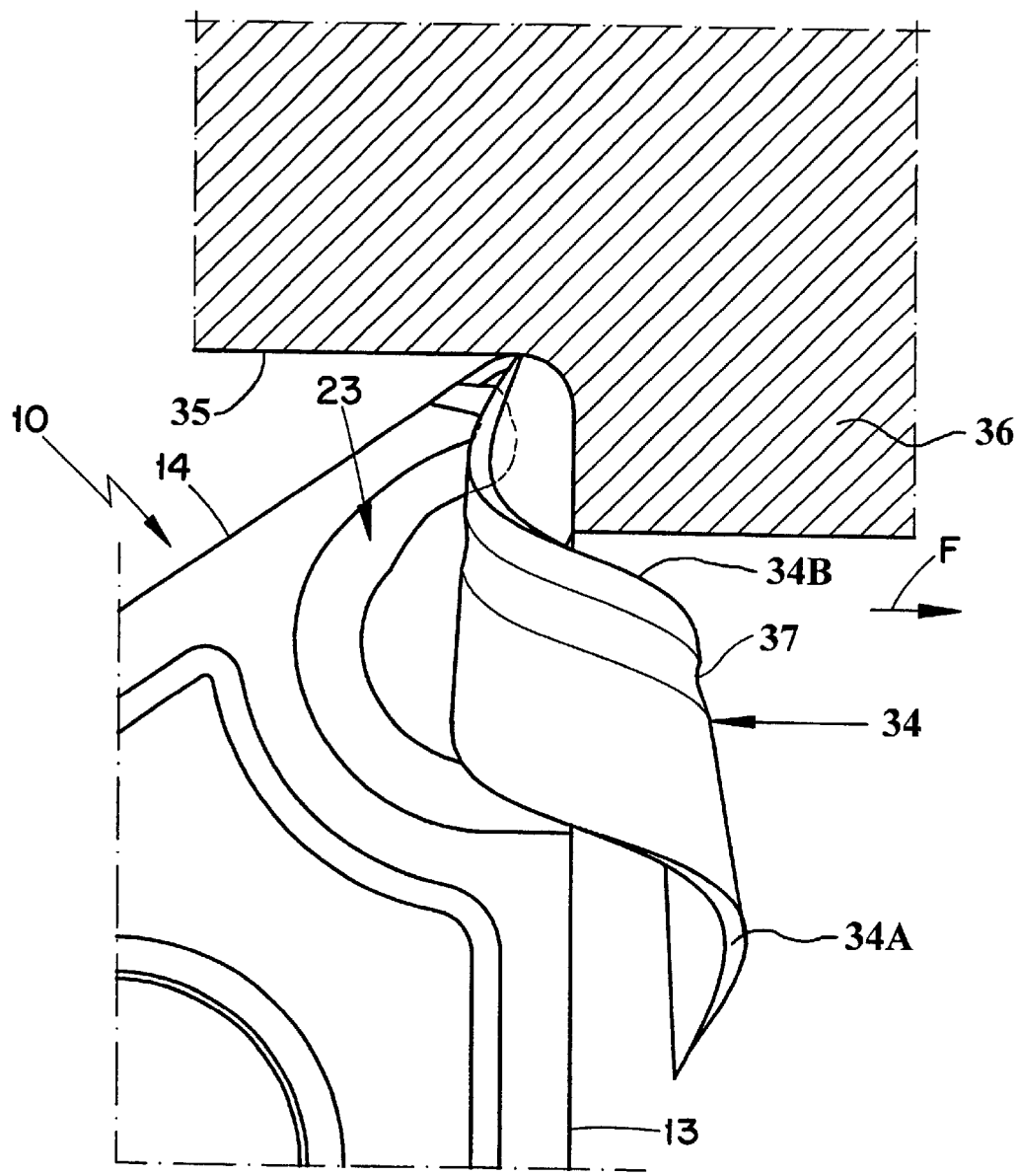
FIG. 7 shows the turning insert during internal turning of a work piece.

The side surface 13 constitutes a leading side surface in that it faces toward the direction of cutting F, whereas the side surface 14 constitutes a trailing side surface in that it faces away from the direction of cutting (see FIG. 7).

The shown cutting insert 10 has a rhombic basic shape and comprises a central fastening hole 15. The cutting insert has two diagonally opposed acute angled cutting corners 18 on each of the upper and lower surfaces. In the shown embodiment the acute angle of each corner is 55° but can alternatively be 60° or 80°. A large recessed space 15A is formed around the hole 15. Each of the upper and lower surfaces 11, 12 includes a substantially circumferential land portion 16 providing a narrow planar support surface or border surface 17, to improve abutment between the cutting insert and the holder. This means that any debris disposed on the support surface of the holder influences the cutting insert position to only a slight degree or not at all, since only a narrow surface of the insert will contact the holder's support surface.

The border surface 17 constitutes a part of the endless land portion 16 that, in the preferred embodiment, is endless and substantially rhombic-shaped. By being endless, this land portion 16 completely surrounds the recessed space 15A. In the shown embodiment, both the surface 17 and the floor of the recess 15A are substantially planar and mutually parallel, and are oriented substantially perpendicularly to the center axis of the hole 15.

Each cutting corner 18 comprises a recessed portion 19 (FIGS. 4, 6), i.e., which is recessed relative to the surface 17. The recessed portion includes a bottom surface 24 and a raised rim 19A which extends around the periphery of the floor 24. The rim 19A includes a top surface 26 which is recessed with respect to the surface 17. A line of intersection between the surface 26 and the side surface 13 forms a major cutting edge 20, and the line of intersection between the top surface 26 and an intermediate corner surface interconnecting the side surfaces 13 and 14 forms a nose cutting edge 21. The nose cutting edge 21 can comprise a number of short straight segments, which together form a generally curved cutting edge, the radius of which being depicted by R and the radius center of which being depicted by Z.

At least one raised chip breaker 23 (to be described below) is provided in each of the lower 12 and upper surfaces 11 such that both sides of the cutting insert can be used economically. The surfaces 11 and 12 in the preferred embodiment are identical but mirror imaged such that when the cutting insert is turned upside down to position the lower surface 12 for a turning operation, that surface will have an appearance which is identical to the upper surface 11 shown in FIG. 4. The side surfaces or flanks, 13, 14 of the cutting corner 18 enclose an angle, the mid portion of which defines a bisector plane Y. The chip breaker 23 is asymmetrical relative to the bisector plane Y, i.e., it is provided substantially in the part of the cutting corner 18 which does not contain the major cutting edge 20. The bottom surface 24 comprises two substantially parallel surface portions 24A, 24B, which lie in spaced-apart respective planes separated by an inclined step 24C.

The bottom surface 24 connects to an upstanding chip surface 25 defined by an inner face of the rim 19A. The chip surface 25 intersects the top surface 26, the latter being slightly inclined (see FIG. 5A). The surface 26 thus constitutes a bevel which reinforces the cutting edges 20 and 21. The bevel 26 forms an angle a between 0-15°, preferably around 5-10°, relative to a plane P which is parallel to the border surface 17 (see FIG. 5D). The major cutting edge 20 is substantially parallel with the plane P and continues straight into an intermediate cutting edge 27 as seen in a top view, which edge 27 rises upwardly in the plane of the side surface 13 towards the nose cutting edge 21. In that way the distance between the cutting edge 21 and the bottom surface portion 24C is substantially constant in the area of the cutting corner 18.

The major cutting edge 20 is situated lower than the nose cutting edge 21 in order to obtain low cutting forces. This reduces particularly the radial cutting force during turning. The intermediate cutting edge 27 and the surface portion 24C may be concave or straight. The chip breaker 23 consists of an inclined wall 28, 29, 30, 31 that according to FIGS. 5B and 5C slopes from the border surface 17 downwardly towards the bottom surface 24. The wall consists of a plurality of segments including a substantially part-conical first or rear segment 28 extending substantially perpendicularly inwardly from the leading side wall 13 and moving past the bisector Y and then again approaching the bisector in a direction towards the nose cutting edge 21. The wall segment 28 is concave as viewed in a direction perpendicularly to the plane of the insert. A second wall segment 29 connects to the first segment 28 and is of convex shape as viewed perpendicularly to the plane of the insert. The segment 29 has a lower edge 29A lying on the surface portion 24C. The edge 29A is intersected by the bisector plane Y at two places A and B. The segment 29 further connects to a convex third wall segment 30, which connects to the surface portion 24B at the part that faces away from the major cutting edge 20. The segment 30 does not reach the center Z of the radius R but is located substantially within a circle defined by the radius R. A fourth wall segment 31 connects to the third segment 30, said segment 31 intersecting the trailing side surface 14 along a sloping line of intersection 32. The line of intersection 32 connects to a passive part of a straight extension 33 of the nose cutting edge 21, The segment 31 connects downwardly to the chip surface 25 and the bevel 26.

The wall segments 29, 30, 31 are disposed forwardly of the segment 28 and are closer than the segment 28 to the nose cutting edge and to the intermediate cutting edge 27.

FIG. 7 shows that the chip breaker 23 is formed such that the chip 34 is guided in a direction where it does not damage the generated surface 35. The cut chips must also be guided in a direction where they do not influence the subsequent machining. To obtain a direction of the chip forming process which does not destroy the generated surface, and to avoid the possibility of the chips, after being cut from the work piece 36, from interfering with the machining, it is important that the chips are formed such that they do not hit against the work piece but instead are directed towards the edge surface 13 of the cutting insert.

In order to achieve this, the chip breaker 23 is provided at a relatively great distance from the major cutting edge 20 such that one edge 34A of the chip 34 is formed with a large radius. That is, the wall segment 28 does not come in contact with the chip during the internal turning. It is thereby possible to form the chip such that it obtains a pitch. To form chips with this pitch which makes it possible to guide the chips past the work piece and down on the leading side surface 13 of the cutting insert, the contact between the chip and chip breaker occurs at the edge 34B of the chip which is closest to the nose of the corner, while the other edge 34A of the chip is not obstructed by, i.e., does no contact, the chip breaker, but can be formed freely. In order to achieve this, the forward segments 29, 30 of the chip breaker 23 are situated closely to both the nose cutting edge 21 and the intermediate cutting edge 27 as compared to the rear segment 28.

In addition, during internal turning and the presence of long moment arms at the turning tool, a cutting insert 10 according to the present invention generates low cutting forces whereby a stable machining is obtained.

Figure 8:
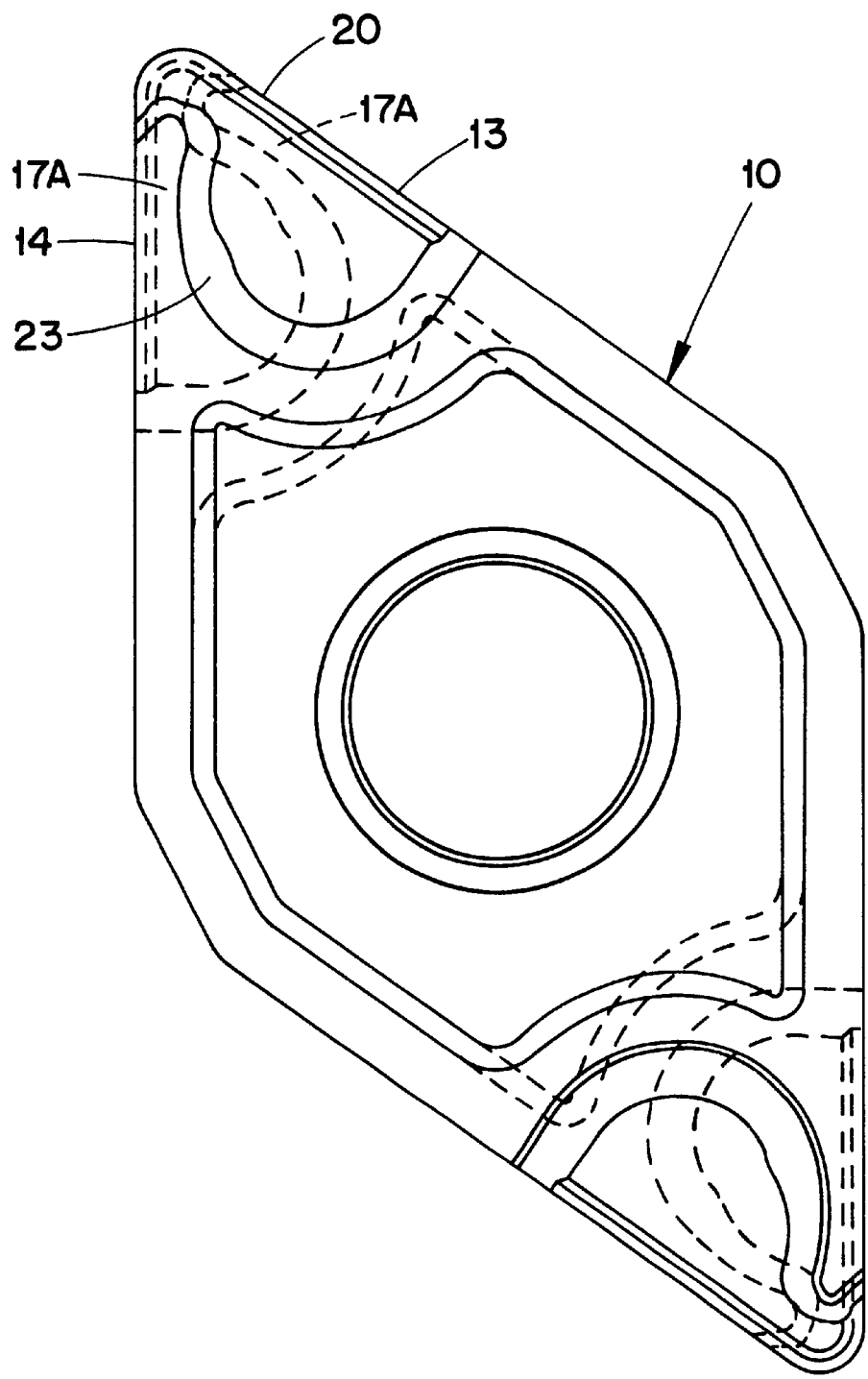
FIG. 8 is a view similar to FIG. 1 wherein the border surfaces on the lower surface of the insert have been shown in broken lines.

From the view of stability it is also important that the contacting interface between the tool holder and the cutting insert is formed such that sufficient support is obtained as close as possible to the cutting action. This has been achieved in that the support surface 17 of the chip breaker situated adjacent the nose of the insert corner is located on only one side of the bisector plane Y and in the region between the bisector plane Y and the trailing side surface 14 (i.e., see the portion 17A of the support surface 17 in FIG. 4). That is, the portion 17A on the upper surface 11 is remote from the effective cutting edge. However, since the lower surface is a mirror image of the upper surface, the portion 17A located on the lower (support) surface 12 is situated beneath the main cutting edge 20 of the upper surface, as can be seen in broken lines in FIG. 8. Thus, the insert is supported where the cutting action takes place. The distance between the support surface 17A and the bisector plane Y is substantially of the same magnitude as the distance between the support surface 17A and the center Z of the radius R. Thereby, a good support is obtained between, for example a shim, and the cutting insert 10 relatively close to the nose cutting edge, i.e., close to the cutting action.

Although the invention has been described in connection with a preferred embodiment thereof, it will be appreciated by those skilled in the art that additions, modifications and deletions not specifically described may be made without departing from the spirit and scope of the invention as defined in the appended claims.

What is claimed is:

1. A turning insert comprising a polygonal body of hard material and including upper and lower surfaces disposed in substantially parallel respective planes, and a plurality of side surfaces each disposed between the upper and lower surfaces; the body including at least one cutting corner formed by two of the side surfaces, those two side surfaces constituting leading and trailing side surfaces, respectively, during a cutting operation; at least the upper surface including a chip former disposed therein; the cutting corner defining a nose having a bisector plane; the chip former being asymmetrically arranged relative to the bisector plane, the chip former comprising an inclined wall having a portion situated adjacent the nose and being of convex shape as viewed in a direction perpendicular to the upper surface; the convex portion including a lower edge intersected at least at two locations by the bisector plane, the body including a center through-hole extending from the upper surface to the lower surface for accommodating a fastener, the center through-hole being intersected by the corner bisector.

2. The turning insert according to claim 1 wherein the inclined wall of the chip former includes an upper edge lying on a planar surface of the upper surface, the upper edge situated on a side of the bisector disposed opposite a direction in which the convex wall portion projects.

3. The turning insert according to claim 1 wherein the inclined wall of the chip former extends from the leading side surface to the trailing side surface.

4. The turning insert according to claim 1 wherein the inclined wall includes a portion of concave shape when viewed in the direction perpendicular to the plane of the insert, the portion of concave shape situated farther from the nose than the convex portion, the concave and convex portions arranged whereby only the convex portion engages a chip during a cutting operation.

5. The turning insert according to claim 1 wherein the nose includes a nose cutting edge defined by a radius having a center of curvature, the convex portion extending toward, but not past such center of curvature.

6. The turning insert according to claim 5 wherein the insert includes a main cutting edge extending along the leading side surface and lying in a first plane spaced from, and situated lower than, a second plane in which the corner cutting edge lies, an inclined intermediate cutting edge interconnecting the corner edge and the main cutting edge.

7. The turning insert according to claim 4 wherein a largest distance between the wall portion of concave shape and a plane of the leading side surface is at least three times larger than a shortest distance between the wall portion of convex shape and that plane.

* * * * *